United States Patent
Damian et al.

(10) Patent No.: US 8,489,893 B2
(45) Date of Patent: Jul. 16, 2013

(54) ENCRYPTION KEY ROTATION MESSAGES WRITTEN AND OBSERVED BY STORAGE CONTROLLERS VIA STORAGE MEDIA

(75) Inventors: Mihai Damian, Campbell, CA (US); Vijay Immanuel, Sunnyvale, CA (US); Geoffrey Ignatius Iswandhi, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 592 days.

(21) Appl. No.: 12/757,855

(22) Filed: Apr. 9, 2010

(65) Prior Publication Data

US 2011/0191595 A1 Aug. 4, 2011

Related U.S. Application Data

(63) Continuation-in-part of application No. 12/696,799, filed on Jan. 29, 2010.

(51) Int. Cl.
*G06F 11/30* (2006.01)

(52) U.S. Cl.
USPC ............................ 713/189; 713/193; 380/277

(58) Field of Classification Search
USPC .................................. 713/193, 189; 380/277
See application file for complete search history.

(56) References Cited

U.S. PATENT DOCUMENTS

| | | | |
|---|---|---|---|
| 4,888,802 A | 12/1989 | Cooney | |
| 5,051,887 A | 9/1991 | Berger et al. | |
| 5,933,653 A | 8/1999 | Ofek | |
| 6,397,307 B2 | 5/2002 | Ohran | |
| 7,240,197 B1 | 7/2007 | Yamagami et al. | |
| 7,627,756 B2 | 12/2009 | Fujibayashi et al. | |
| 2006/0136732 A1 | 6/2006 | Vandermolen | |
| 2007/0079119 A1 | 4/2007 | Mattsson et al. | |
| 2007/0079140 A1 | 4/2007 | Metzger et al. | |
| 2008/0063210 A1* | 3/2008 | Goodman et al. | 380/286 |
| 2008/0240428 A1* | 10/2008 | Hobbet et al. | 380/45 |
| 2008/0240434 A1 | 10/2008 | Kitamura | |
| 2008/0260159 A1 | 10/2008 | Osaki | |
| 2009/0060201 A1 | 3/2009 | Rhodes et al. | |
| 2009/0196414 A1 | 8/2009 | Mittal et al. | |
| 2009/0199016 A1 | 8/2009 | Kishi | |

OTHER PUBLICATIONS

Ingrain Networks, Online Key Rotation with Ingrain, http://www.ingrian.com/resources/sol_briefs/Ingrian%20online%20key%20rotation.pdf, Jun. 4, 2007, 2 pages.

* cited by examiner

*Primary Examiner* — Edward Zee
*Assistant Examiner* — Baotran N To

(57) ABSTRACT

Storage media is coupled to first and second storage controllers. When the first storage controller performs encryption key rotation, the first storage controller writes a key rotation message to a storage controller metadata section of the storage media indicating that key rotation is underway. The second storage controller observes the key rotation message indicating that key rotation is underway and suspends access by the second storage controller to encrypted portions of the storage media.

20 Claims, 8 Drawing Sheets

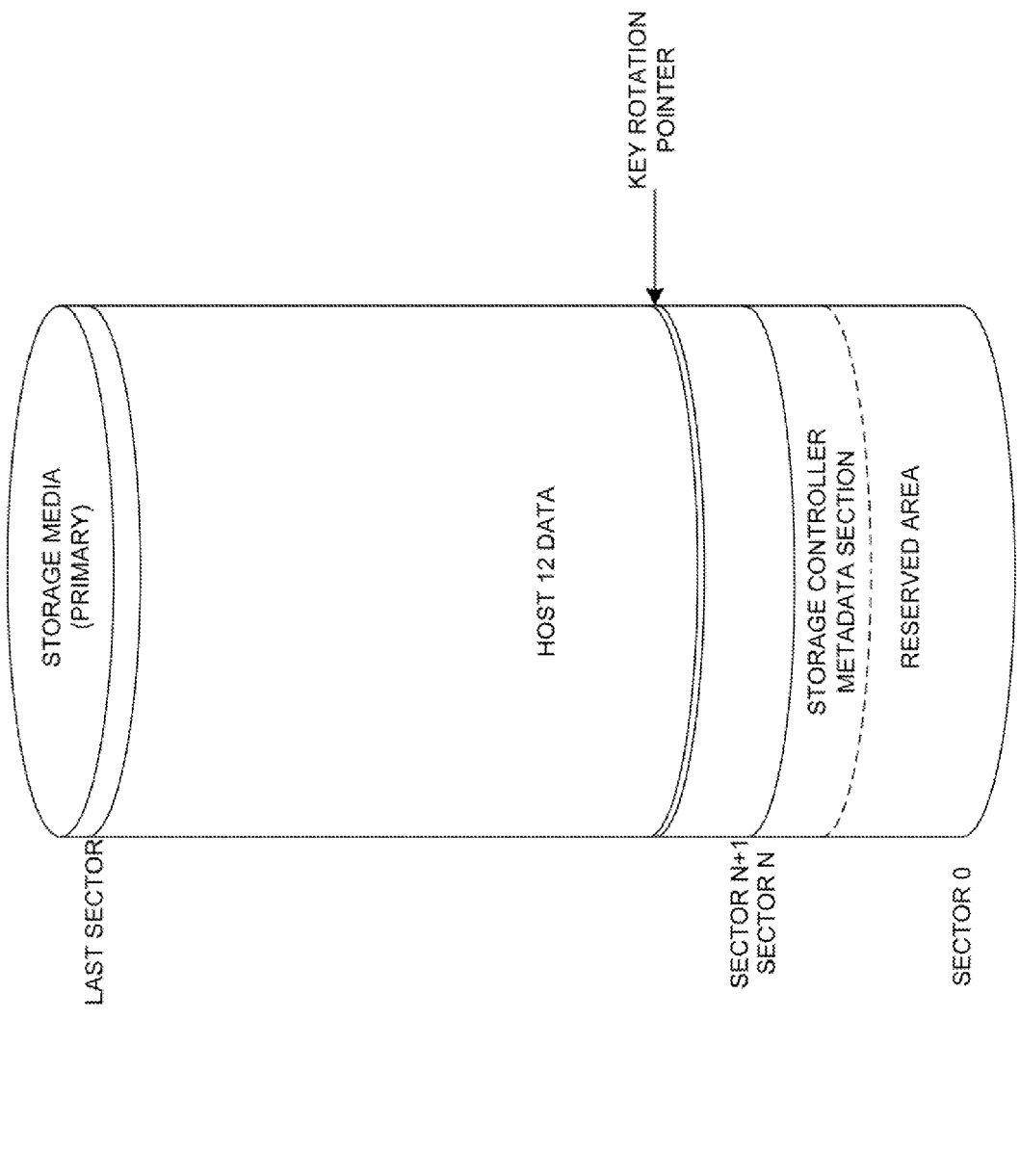

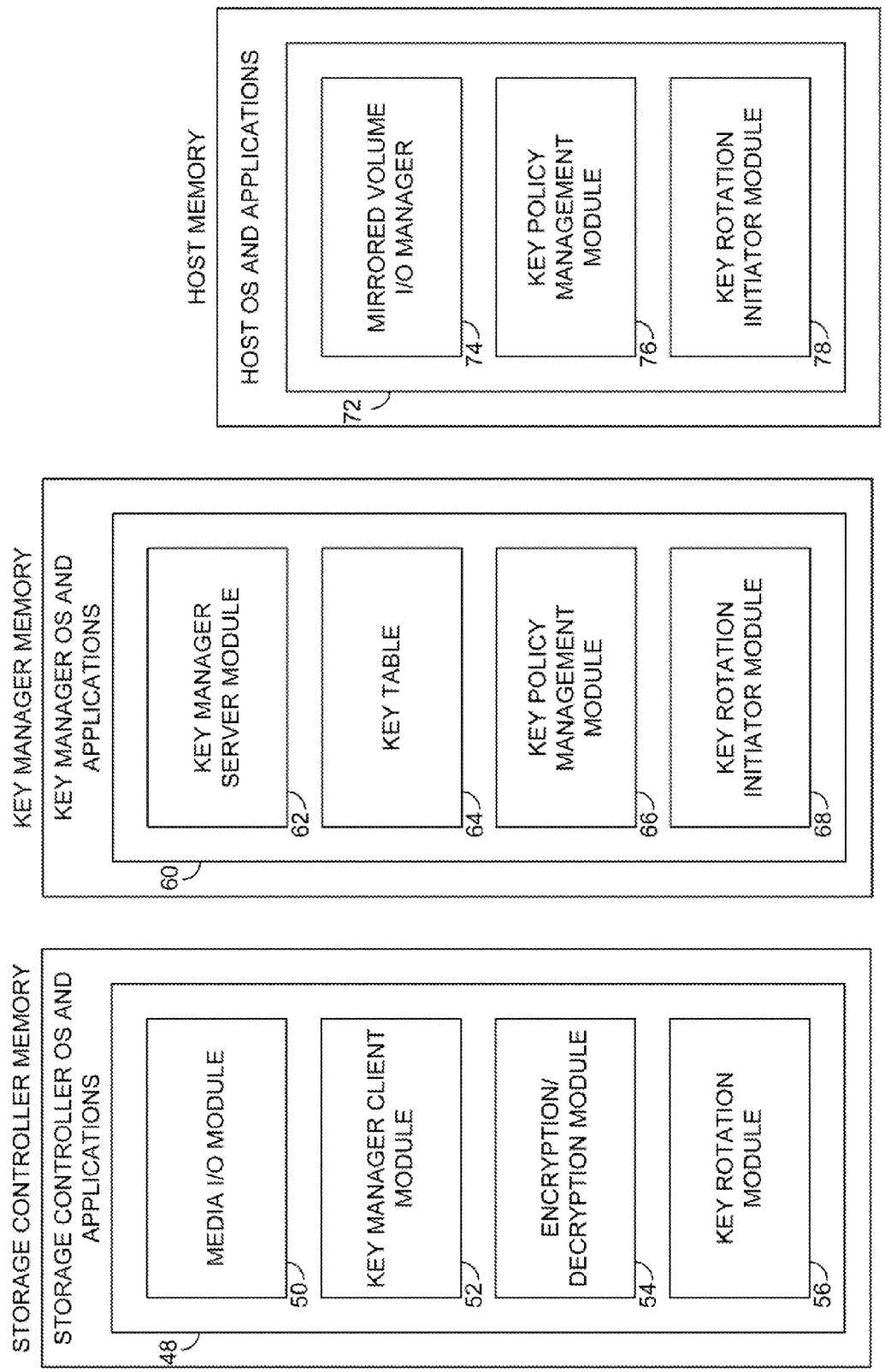

US 8,489,893 B2

ENCRYPTION KEY ROTATION MESSAGES WRITTEN AND OBSERVED BY STORAGE CONTROLLERS VIA STORAGE MEDIA

CROSS-REFERENCES TO RELATED APPLICATION

The present patent application is a continuation-in-part of a patent application entitled KEY ROTATION FOR ENCRYPTED STORAGE MEDIA by Wendy B. Bartlett, Vijaykumar Immanuel, Mihai Damian, and Geoffrey Ignatius Iswandhi, which was filed on Jan. 29, 2010 and assigned application Ser. No. 12/696,799.

BACKGROUND

In the art of computing, it is desirable to encrypt data stored on persistent storage media, such as hard disk drives. Encryption protects the data from unauthorized access, and theft of the media upon which the data is stored.

Data is encrypted using encryption keys, and it is desirable to periodically rotate encryption keys. For data that is already encrypted, the key rotation process comprises reading data encrypted with the old encryption key from the storage media, decrypting the data using the old key, encrypting the data with the new key, and writing the data encrypted with the new key back to the storage media. It is desirable to have the ability to perform key rotation while the system continues normal operation In the art of computing, it is also desirable to provide redundancy so that operation of a computer system can continue after the failure of a component. One method known in the art for enhancing storage redundancy is to provide two or more storage controllers for each storage media device. In the event that one of the storage controllers fails, operation can continue since each storage media device continues to have at least one functioning storage controller.

BRIEF DESCRIPTION OF THE DRAWINGS

The Figures depict embodiments, examples, implementations, and configurations of the invention, and not the invention itself.

FIG. 3 is a block diagram of storage media shown in FIG. 1, in accordance with examples of the present invention.

FIG. 4 shows memory associated with the storage controller, in accordance with examples of the present invention.

FIG. 5 shows memory associated with the key manager, in accordance with examples of the present invention.

FIG. 6 shows memory associated with the host or disk array subsystem controller, in accordance with examples of the present invention.

DETAILED DESCRIPTION

Figure 1:
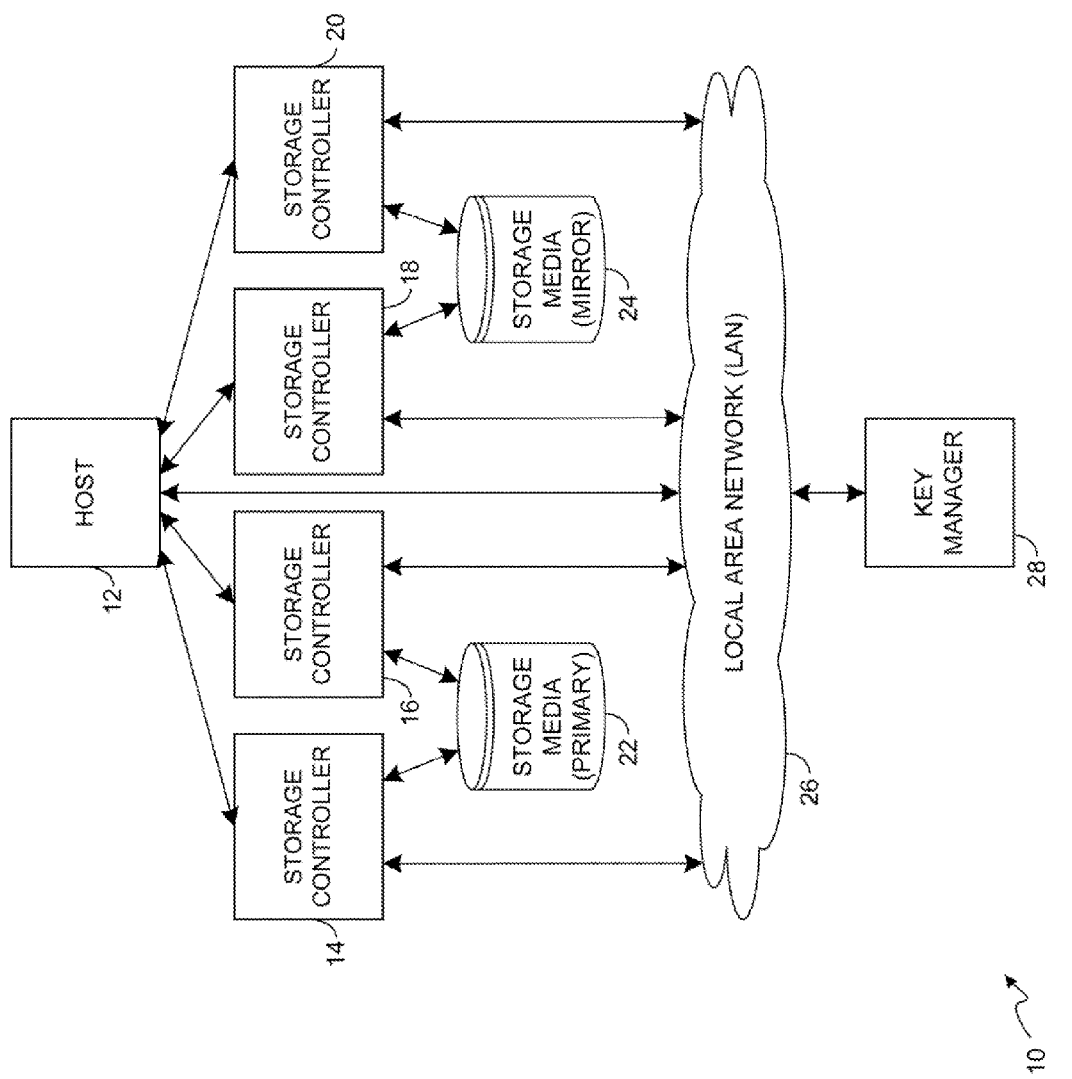
FIG. 1 is a block diagram of a computing environment in which examples of the present invention are deployed, in accordance with examples of the present invention.

In the foregoing description, numerous details are set forth to provide an understanding of the present invention. However, it will be understood by those skilled in the art that the present invention may be practiced without these details. While the invention has been disclosed with respect to a limited number of embodiments and examples, those skilled in the art will appreciate numerous modifications and variations therefrom. It is intended that the appended claims cover such modifications and variations as fall within the true spirit and scope of the invention.

Examples of the present invention perform key rotation in systems having two or more storage controllers coupled to a storage media device. In accordance with examples of the invention, when key rotation is desired for a particular storage media device, a first storage controller is signaled to perform the key rotation, and the first storage controller writes a message to a storage controller metadata section of the storage media device indicating that the first storage controller is performing key rotation. Other storage controllers coupled to the storage media device are signaled to read the storage controller metadata section, and respond to the message by not accessing portions of the storage media device undergoing key rotation. After the first storage controller has finished performing key rotation, the first storage controller writes a message to the storage controller metadata section indicating that no key rotation is in progress. At the end of key rotation, the other storage controllers are signaled to read the storage controller metadata section. Alternatively, the other storage controllers may periodically poll the storage controller metadata section. When the other storage controllers read the message from the storage controller metadata section indicating that no key rotation is in progress, the other storage controllers may resume access to the storage media device using the new encryption key.

The process of encryption transforms plaintext data into encrypted data using an encryption key. The process of decryption transforms encrypted data back into plaintext form using a decryption key. Encrypted data is secure because it cannot be decoded into plaintext form without the decryption key. As used herein, the term "key rotation" includes transforming plaintext data to encrypted data, transforming encrypted data to plaintext data, and transforming data encrypted with a first encryption key into data encrypted with a second encryption key.

There are two types of encryption, asymmetric and symmetric. Asymmetric encryption uses an encryption key to encrypt the data, and a different decryption key to decrypt the data. Encryption keys can be public so that anyone can encrypt the data, and the decryption keys can be kept private so that only the key holder can decrypt the data. RSA encryption is an example of asymmetric encryption. Asymmetric encryption is especially useful for communication between remote entities or devices, since each entity or device does not need to know the secret key of the other entity or device. For example, secure communication between devices coupled by the Internet is typically performed by asymmetric communication.

Symmetric encryption uses the same key for both encryption and decryption. The key is kept secret. Blowfish, Defense Encryption Standard (DES), triple DES, and Advanced Encryption Standard (AES) are typical examples of symmetric encryption. Symmetric encryption is well suited for applications having large amounts of data accessed by the same device or entity, since the device or entity can keep the key secret.

The algorithms used in symmetric encryption are bidirectional. Decryption is the reverse process of encryption. Symmetric block-level encryption, sometimes referred to as a block cipher, divides the data to be encrypted into blocks or groups of characters, and the encryption algorithm is applied to each block. Key length varies according to the cipher, with DES having 56-bit keys, and AES having 128-bit, 192-bit, or 256-bit keys. IEEE Standard 1619 provides for cryptographic protection of data on block-oriented storage devices, such as disk drives, flash memory, optical drives, and the like.

The discussion below assumes that symmetric encryption will be used when describing examples of the present invention. Accordingly, the terms "key" and "encryption key" are used interchangeably when referring to encryption and decryption processes. However, those skilled in the art will recognize that asymmetric encryption may be used with examples of the present invention. If asymmetric encryption is used, than a different decryption key is used to perform decryption operations.

FIG. 1 is a block diagram of computing environment 10, in which examples of the present invention are deployed. Environment 10 includes host 12, storage controllers 14, 16, 18, 20, storage media 22 and 24, local area network (LAN) 26, and key manager 28. Storage controllers 14, 16, 18, and 20 are coupled to host 12. Typically, the host and storage controllers will be coupled by a high speed fabric, such as InfiniBand or ServerNet switched fabrics, or Fibre Channel, iSCSI, or SCSI connections. ServerNet switched fabrics are used in NonStop computing environments provided by Hewlett-Packard Company. Of course, other connection fabrics may be used, such as PCI and PCIe connections, Ethernet connections, USB connections, Firewire connections, and the like. Although only single connections are shown in FIG. 1, redundant connections may also be provided. The connections between the storage controllers and the storage media will typically be connections used to connect disk drives to controllers, such as IDE, SATA, SAS, Fibre Channel (FC) or SCSI connections. Of course, other connections may also be used. Host 12, storage controllers 14, 16, 18, 20, and key manager 28 are all coupled to LAN 26. Note that in other configurations, some of the connections shown in FIG. 1 may not be required.

In some configurations, storage media 22 and 24 are implemented using a dual ported hard disk drive, such as the HP 600 GB 6G SAS 15K LFF (3.5-inch) Dual Port Enterprise Hard Drive, which is a product of Hewlett-Packard Company. Dual ported SAS hard drives provide two separate data paths, thereby allowing each hard drive to be coupled to two storage controllers, and allowing the drive to continue operation if there is a failure along one of the data paths. Note that it is also within the scope of the present invention to use storage devices coupled to more than two storage controllers.

Only connections and devices needed to understand examples of the present invention are shown in FIG. 1. Of course, in a typical configuration, other connections and devices will be present. For example, other service and management processors may be provided, and additional redundant connections may be provided.

During normal operation, storage media 22 is a primary storage device, and storage media 24 mirrors the data stored on storage media 22. In general, write operations must be performed to both storage devices, but read operations need only be serviced from one of the storage devices. Typically, the storage device that services read operations is the primary storage device, and the other storage device is the mirror storage device. However, the primary and mirror storage devices may service different read operations simultaneously to allow for load balancing.

Also note that each storage media device is coupled to two storage controllers. Typically, the path between one storage controller and a storage device will be designated as an active path that will carry all I/O requests during normal operation, and the path between the other storage controller and the storage device will be designated as a backup path that will only carry I/O requests in the event that the active path fails.

Host 12 is responsible for managing the mirrored volume, and is responsible for sending data to be written to the mirrored volume to both storage media 22 and 24. Storage controllers 14, 16, 18, and 20 are responsible for encrypting and decrypting data blocks as the data blocks are written to and read from storage media 22 and 24.

As will be discussed in greater detail below, the encryption keys themselves are not stored on storage media 22 and 24. However, a key name is stored on each storage media. When the storage controllers are initialized, the storage controllers retrieve the key name from the storage media and provide the key name to key manager 28. Key manager 28, in turn, provides the encryption key to the storage controllers, which use the encryption key to access the data on the storage media. Although not shown in FIG. 1, it may be desirable to provide a redundant key manager to provide keys to storage controllers 14, 16, 18, and 20 in the event that key manager 28 fails.

For the purposes of understanding examples of the present invention, host 12, storage controllers 14, 16, 18, and 20, and key manager 28 can all be viewed as general purpose computers. Of course, in an actual deployment, the host, storage controllers, and key manager will have different capabilities. For example, host 12 may have a greater number of faster CPUs and significantly more memory than storage controllers 14, 16, 18, and 20, and key manager 28.

Figure 2:
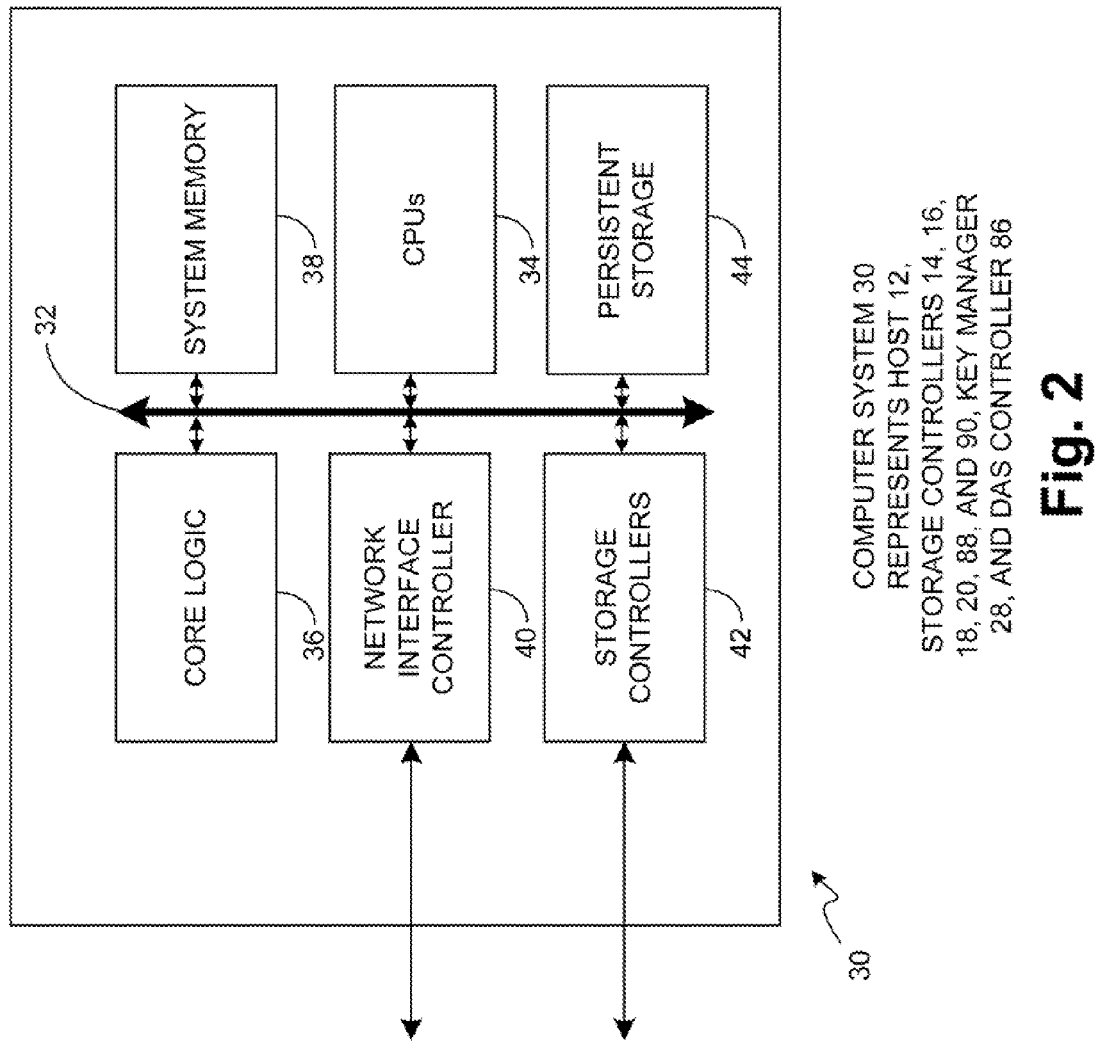
FIG. 2 shows a computer system that represents, in basic form, a host or disk array subsystem controller, storage controllers, and a key manager, each of which is shown in FIG. 1, in accordance with examples of the present invention.

FIG. 2 shows a computer system 30 that represents, in basic form, host 12, storage controllers 14, 16, 18, and 20, and key manager 28. FIG. 2 also represents storage controllers 88 and 90, and disk array subsystem (DAS) controller 86, which will be discussed below with reference to FIG. 8. Computer system 30 includes a bus 32. Coupled to bus 32 are one or more CPUs 34, core logic 36, system memory 38, network interface controller 40, storage controllers 42, and persistent storage 44.

Although bus 32 is shown generically as a single bus, those skilled in the art will recognize that typically a variety of busses and fabrics are used to connect the components shown in FIG. 2. CPUs 34 may represent a single CPU, multiple CPUs in individual integrated circuit (IC) packages, multiple CPU cores in a discrete IC package, or any combination of these elements. Core logic 36 represents the core logic that couples CPUs 34, system memory 38, network interface controller 40, storage controllers 42, and persistent storage 44. In some architectures, core logic 36 includes a Northbridge and a Southbridge. However, other architectures are known in the art. For example, in some architectures, the memory controller is provided in the CPU.

For the purposes of describing examples of the present invention, core logic 36 also includes other components found in a typical computer system, such as firmware and I/O components, disk controllers for local persistent storage, USB ports, video controllers, and the like. In a server, some of these components may not be utilized. Persistent storage 44 represents storage used to store local copies of the operating system, applications, and other programs and data. Persistent storage 44 may represent devices such as hard disk drives, solid state drives, tape drives, optical drives, and the like. Alternatively, persistent storage may be provided external to computer 30. Network interface controller connects computer 30 to a network, such as LAN 26 in FIG. 1.

For host 12, storage controllers 42 represent the controllers that interface to the fabric coupling host 10 to the storage controllers 14, 16, 18, and 20. Examples of such fabrics are discussed above. For storage controllers 14, 16, 18, and 20, storage controllers 42 represent the controllers that couple the storage controllers to storage media 22 and 24. Examples of such connections are discussed above. In some configurations, these interfaces may be provided as part of core logic 36. Also note that key manager 28 may not require a storage controller 42 to access storage that is external to key manager 28.

FIG. 3 is a block diagram of storage media 22 of FIG. 1. A block diagram of storage media 24 would be substantially the same. Space on the media is identified by sectors from sector 0 to the last sector. A typical sector size is 512 bytes, but those skilled in the art will recognize that other sector sizes, such as 4096 bytes, may be used.

Sectors 0-N are reserved for system information, such as the media volume, and other information that identifies the media. Within this reserved area is a storage controller metadata section for the storage controllers to store information, such as data indicating whether or not the media is encrypted, the key name, an algorithm identifier that identifies the encryption algorithm, and a key rotation message indicating whether or not the storage media is undergoing encryption. The key itself is not stored on the media. The key is stored in key manager 28, and the key name is used to identify the key. Typically, the storage controller metadata section will not be encrypted so that a storage controller may retrieve the key name to provide to key manager 28, and read key rotation messages during key rotation. Note that some of the fields of the storage controller metadata section are discussed in greater detail below with reference to FIG. 9.

One advantage provided by storing encryption information in the storage controller metadata section is that the storage media may be easily moved to another set of storage controllers. Upon coupling storage media to new storage controllers, the new storage controllers can read the key name from the storage controller metadata section, obtain the key from the key manager, and begin accessing the encrypted portions of the storage media.

Also shown in FIG. 3 is a key rotation pointer. The key rotation pointer identifies a position within storage media 22 currently undergoing key rotation. The key rotation pointer will be described in greater detail below.

FIG. 4 shows storage controller memory 46, and the modules that operate the storage controllers. With reference to FIG. 2, if computer system 30 represents one of the storage controllers, the contents of storage controller memory 46 may exist at any point in time, in whole or in part, in system memory 38, persistent storage 44, and cache memories of CPUs 34 and core logic 36. Furthermore, code and data implementing the modules may be duplicated in the various components mentioned above.

Storage controller memory 46 includes storage controller OS and applications 48. Within storage controller OS and applications 48 are media I/O module 50, key manager client module 52, encryption/decryption client module 54, and key rotation module 56.

Media I/O module 50 manages I/O between host 12 and storage media 22 or 24. Media I/O module 50 also reads key rotation messages from the storage controller metadata section of the storage media, as shown in storage media 22 of FIG. 3. Reading of the key rotation messages may be initiated by host 12, or alternatively, media I/O module 50 may periodically poll the storage controller metadata section. If the key rotation message indicates that another storage controller is performing key rotation, media I/O module 50 will suspend access to the encrypted portions of the storage media, such as host 12 data of storage media 22 of FIG. 3. If the key rotation message indicates that the storage media is not undergoing key rotation, media I/0 module 50 will allow access to the encrypted portions of the storage media.

Key manager client module 52 communicates with key manager 28. Key manager client module 52 provides a key name from storage media 22 or 24 to key manager 28, and key manager 28 returns the encryption key used to encrypt and decrypt data stored on storage media 22 or 24.

Encryption/decryption module 54 cooperates with key manager client module 52 to receive the encryption key. In cooperation with media I/O module 50, encryption/decryption module 54 encrypts data blocks being written to storage media 22 or 24, and decrypts data blocks being read from storage media 22 or 24.

Finally, key rotation module 56 manages key rotation, including keeping track of which data blocks are encrypted with an old key, and which data blocks are encrypted with a new key, so that ongoing storage media access from host 12 uses the proper key. Key rotation module 56 writes a key rotation message to the storage controller metadata section indicating that the controller is performing key rotation, and cooperates with modules 50, 52, and 54 to implement key rotation. After key rotation is complete, key rotation module 56 writes a message to the storage controller metadata section indicating that the storage device is not undergoing key rotation. Key rotation will be described in greater detail below.

FIG. 5 shows key manager memory 58, and the modules that operate key manager 28. With reference to FIG. 2, if computer system 30 represents key manager 28, the contents of key manager memory 58 may exist at any point in time, in whole or in part, in system memory 38, persistent storage 44, and cache memories of CPUs 34 and core logic 36. Furthermore, code and data implementing the modules may be duplicated in the various components mentioned above.

Key manager memory 58 includes key manager OS and applications 60. Within key manager OS and applications. 60 are key manager server module 62, key table 64, key policy management module 66, and key rotation initiator module 68.

Key manager server module 62 communicates with key manager client module 52. Encryption keys and key names are stored in key table 64. When a storage controller needs to receive an encryption key for the storage media attached to the storage controller, key manager client module 52 sends the key name to key manager server module 62, which in turn retrieves the key from key table 64 using the key name, and transmits the key to key manager module 52. Communication between key manager server module 62 and key manager client module 52 may occur over a secure channel, such as a channel using Hypertext Transfer Protocol Secure (HTTPS), or channels secured by Transport Layer Security (TLS) or Secure Sockets Layer (SSL).

Key policy manager module 66 enforces key management policies. For example, module 66 may enforce key rotation at periodic intervals, such as monthly or yearly. Key rotation initiator module 68 initiates key rotation. As will be discussed below, the key rotation initiation process includes signaling a first storage controllers to write a key rotation message to the storage controller metadata section, and signaling the other storage controllers to read the key rotation message so that the other storage controllers suspend access to the encrypted portions of the storage media while the first storage controller performs key rotation. Note that key policy management and key rotation initiation may also be performed by host 12, as described below.

FIG. 6 shows host memory 70, and includes the modules that operate host 12. Note that a disk array subsystem (DAS) is discussed below with reference to FIG. 8. When examples of the present invention are deployed in a DAS, a DAS controller may implement many of the functions associated with host 12 shown in FIG. 7.

With reference to FIG. 2, if computer system 30 represents host 12, the contents of host memory 70 may exist at any point in time, in whole or in part, in system memory 38, persistent storage 44, and cache memories of CPUs 34 and core logic 36. Furthermore, code and data implementing the modules may be duplicated in the various components mentioned above.

Host memory 70 includes host and OS applications 72. Within host and OS applications 72 are mirrored volume I/O manager 74, key policy management module 76, and key rotation initiator module 78.

Mirrored volume I/O manager 74 manages media I/O transfers such that each read operation stores data on primary storage media 22, with the data mirrored at storage media 24. Since two storage controllers are provided for each storage media, there are redundant paths to the storage media. Typically, one path will be designated as an active path, and the other path will be designated as a backup path that is only used if the active path fails.

As mentioned above, both key manager memory 60 and host memory 70 have a key policy management module and a key rotation initiator module. In various examples of the present invention, these functions may be performed from host 12 or key manager 28, or a combination of key manager 28 and host 12. For example, host 12, could enforce a policy mandating monthly key rotation from key policy management module 76, and request that key rotation initiator module 68 of key manager 28 initiate key rotation. Conversely, key policy management module 66 of key manager 28 could enforce the key rotation policy, and request that key rotation initiator module 78 of host 12 initiate key rotation.

Figure 7:
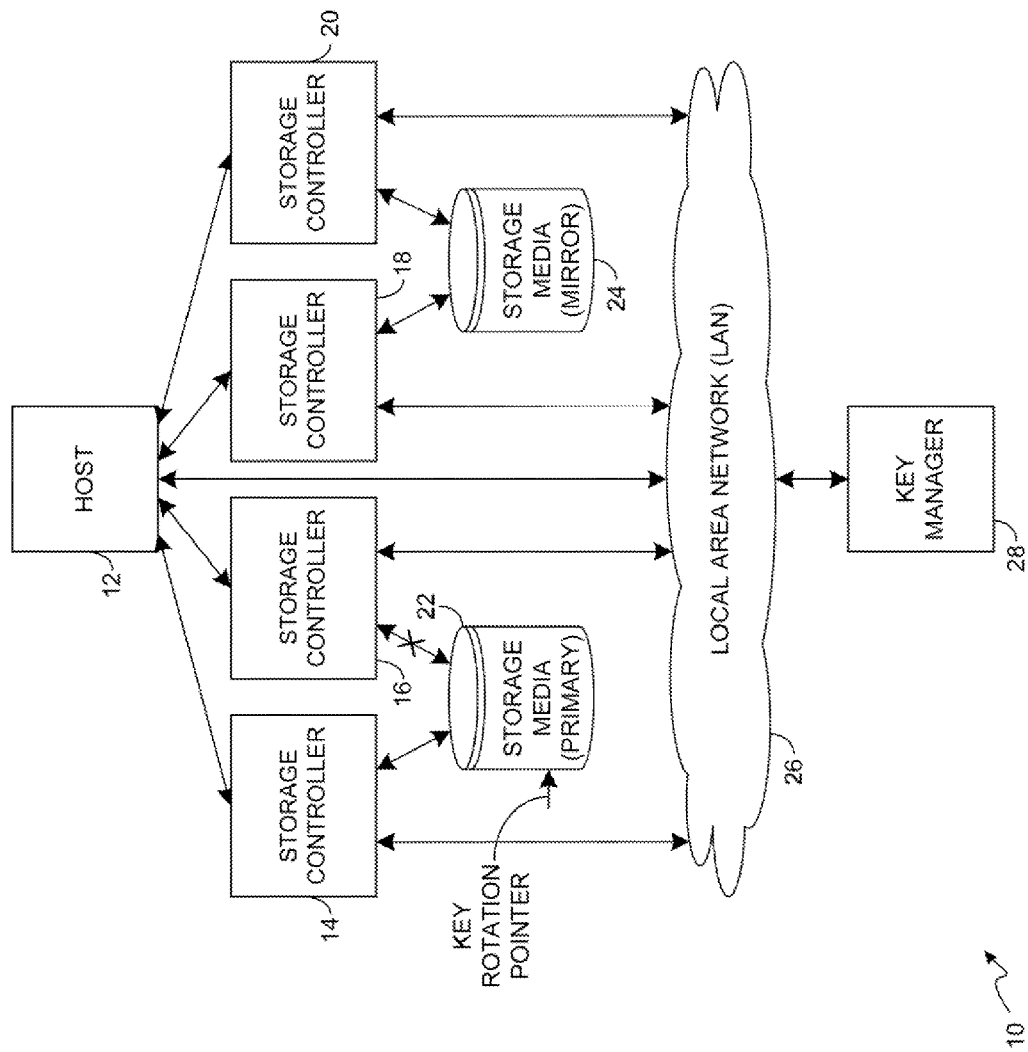
FIG. 7 shows the computer environment of FIG. 1 during key rotation, in accordance with examples of the present invention.

FIG. 7 shows computer environment 10 of FIG. 1 during key rotation. Key rotation may be launched manually by a system administrator, or via an automated process from key policy management module 66 of key manager 28, or key policy management module 76 of host 12. Either key rotation initiator module 68 of key manager 28 or key rotation initiator module 78 of host 12 will be signaled to initiate key rotation. In the example discussed below, key rotation will be performed upon storage media 22 by storage controller 14. However, storage controller 16 could also be used to perform the key rotation. Similarly, key rotation may be performed on storage media 24 by either storage controller 18 or 20.

With reference to the example shown in FIG. 7, when key rotation is initiated by either key rotation initiator module 68 of FIG. 5 or key rotation initiator module 78 of FIG. 6, module 68 or 78 signals storage controller 14 to write a key rotation message to the storage controller metadata section of storage media 22, and signals storage controller 16 read the key rotation message from storage media 22. Storage controller 16 observes the key rotation message by suspending access to the encrypted portions of storage media 22. This is represented in FIG. 7 by the "X" in the link between storage controller 16 and storage media 22.

Next, module 68 or 78 signals key manager client module 52 of storage controller 14 and key manager server module 62 of FIG. 5 of key manager 28 to negotiate a new encryption key. The new key is generated by key manager server module 62, stored in key table 64, and provided to key rotation module 56 of storage controller 14.

At this point, key rotation manager 56 of storage controller 14, in cooperation with modules 50, 52, and 54 of storage controller 14, begins key rotation. Key rotation is performed in blocks, with a block being read from storage media 22, decrypted with the old key, encrypted with the new key, and written back to storage media 22. A typical block size is 256 kilobytes. While it is more efficient to perform key rotation on larger blocks, the block contents are not available to host 12 during key rotation, so smaller blocks minimize unavailability. One implementing examples of the present invention may select block size to balance efficiency and availability.

In FIGS. 3 and 7, as key rotation proceeds, the key rotation pointer points to the block undergoing key rotation. With reference to FIG. 3, data blocks between the beginning of host 12 data and the key rotation pointer are encrypted with the new key, and data areas after the key rotation pointer are encrypted with the old key.

During key rotation, storage controller 14 continues to service storage media I/O requests from host 12. If an I/O request is for data that has undergone key rotation, the new key is used to decrypt the data for read requests and encrypt the data for write requests. If the I/O request is for data that has not undergone key rotation, the old key is used. If the I/O request is for data within a data block currently undergoing key rotation at the data block referenced by the key rotation pointer, they I/O request is deferred until key rotation for that data block has been completed, after which the new key is used to service the I/O request.

After storage controller 14 finishes key rotation, storage controller 14 replaces the key rotation message in the storage controller metadata section of storage media 22 with a message indicating that the storage media is currently not undergoing key rotation, and signals module 68 or 78 that key rotation is complete. In turn, module 68 or 78 signals storage controller 16 to read the storage controller metadata section, or alternatively, storage controller 16 periodically polls the storage controller metadata section. Upon reading the message indicating that storage media 22 is not undergoing key rotation, storage controller 22 reads the new key name from the storage controller metadata section, retrieves the new key from key manager 28, and resumes access to storage media 22.

In the discussion above, examples of the present invention were discussed with reference to a mirrored configuration, such as NonStop computing environments provided by Hewlett-Packard Company. However, examples of the present invention may be deployed in any computing environment having storage devices coupled to two or more storage controllers, such as computing environment 80 of FIG. 8.

Figure 8:
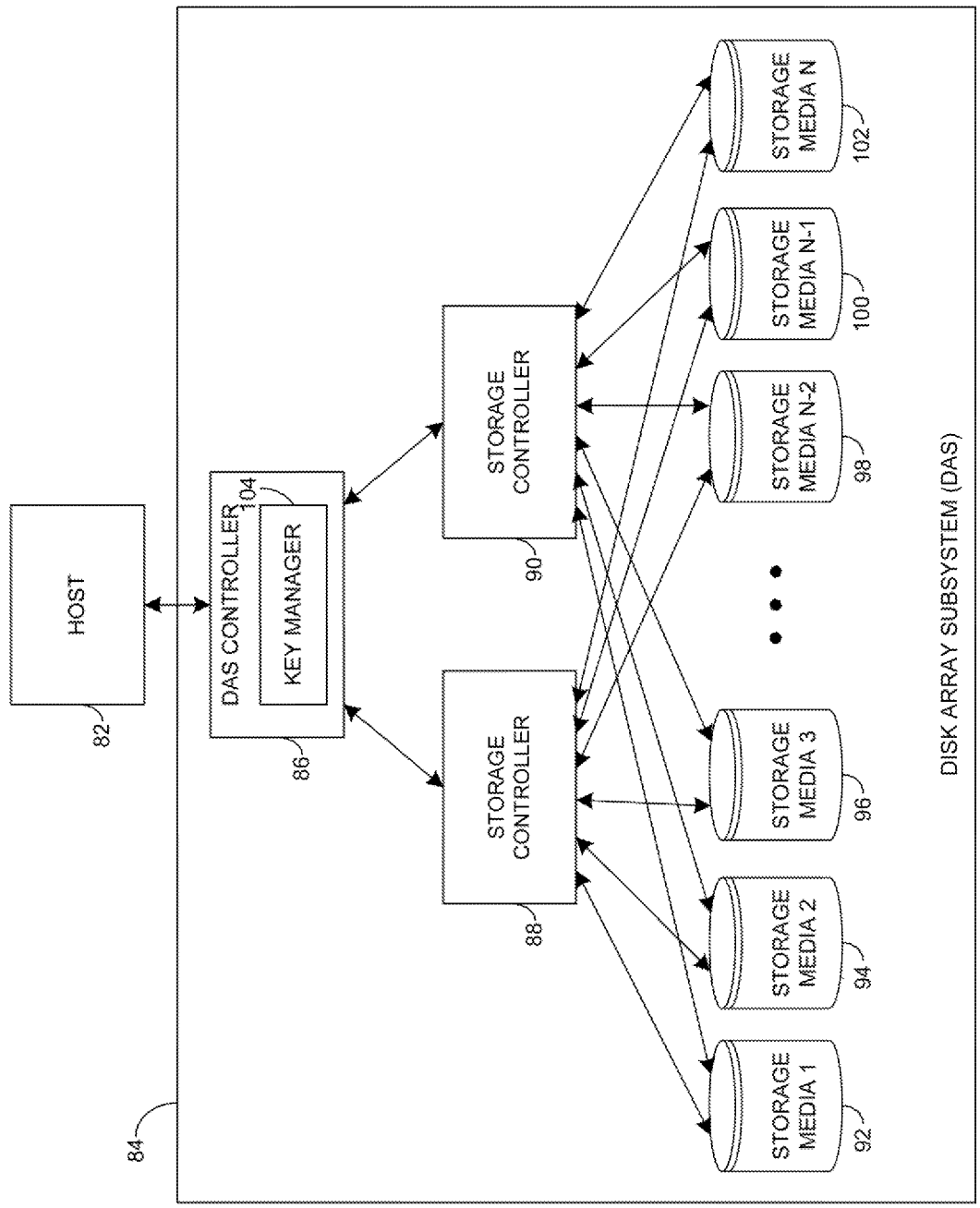
FIG. 8 shows a disk array subsystem and host in which examples of the present invention may be deployed.

In FIG. 8, computing environment 80 includes a host 82 and a disk array subsystem (DAS) 84. DAS 84 includes a DAS controller 86, storage controllers 88 and 90, and storage media devices 1-N, which are labeled as storage media 92, 94, 96, 98, 100, and 102 in FIG. 8. Each of the N storage media devices is coupled to both storage controllers 88 and 90. DAS controller 86 also includes key manager 104. Note that the key manager could also be provided external to DAS 84 and coupled to DAS 84 via a LAN in a manner similar to the configuration shown in FIGS. 1 and 7.

In such a configuration, host 82 may not be aware that the data in DAS 84 is encrypted, and host 82 may not be aware when key rotation is underway. Furthermore, host 82 may not be aware that DAS 84 provides redundancy. These functions may be completely contained within DAS 84. Accordingly, DAS controller 86 provides some of the functionality provided by host 12 and key manager 28 in the discussion above.

DAS 84 may provide any type of real-time data redundancy known in the art, such as RAID 1 (mirroring), RAID 3 or 4 (striped disks with dedicated parity), RAID 5 (striped sets with distributed parity or interleaved parity), or RAID 6 (striped disks with dual parity). Alternatively, DAS 84 may not provide any real-time data redundancy, and only provided data path redundancy via dual storage controllers and dual ported hard drives. Data redundancy may also be provided by an aggressive backup schedule, with data backups sent to other storage devices either on site or off site.

Note that both storage controllers 88 and 90 may be performing key rotation on different storage media devices at the same time. Furthermore, each storage controller 88 or 90 may perform key rotation on multiple storage media devices at the same time. However, note that if a group of storage media devices are participating in a real-time data redundancy configuration, such as the RAID configurations discussed above, it may be desirable to only perform key rotation on one storage device of the group at a time. If there is a failure in the storage controller performing key rotation, or in the storage media device undergoing key rotation, normal operation can continue with the other storage devices in the redundancy group, and the failed device can be replaced and the data on the storage media device affected by the failure can be rebuilt from the data on the other storage devices in the group in accordance with the type of redundancy employed.

Figure 9:
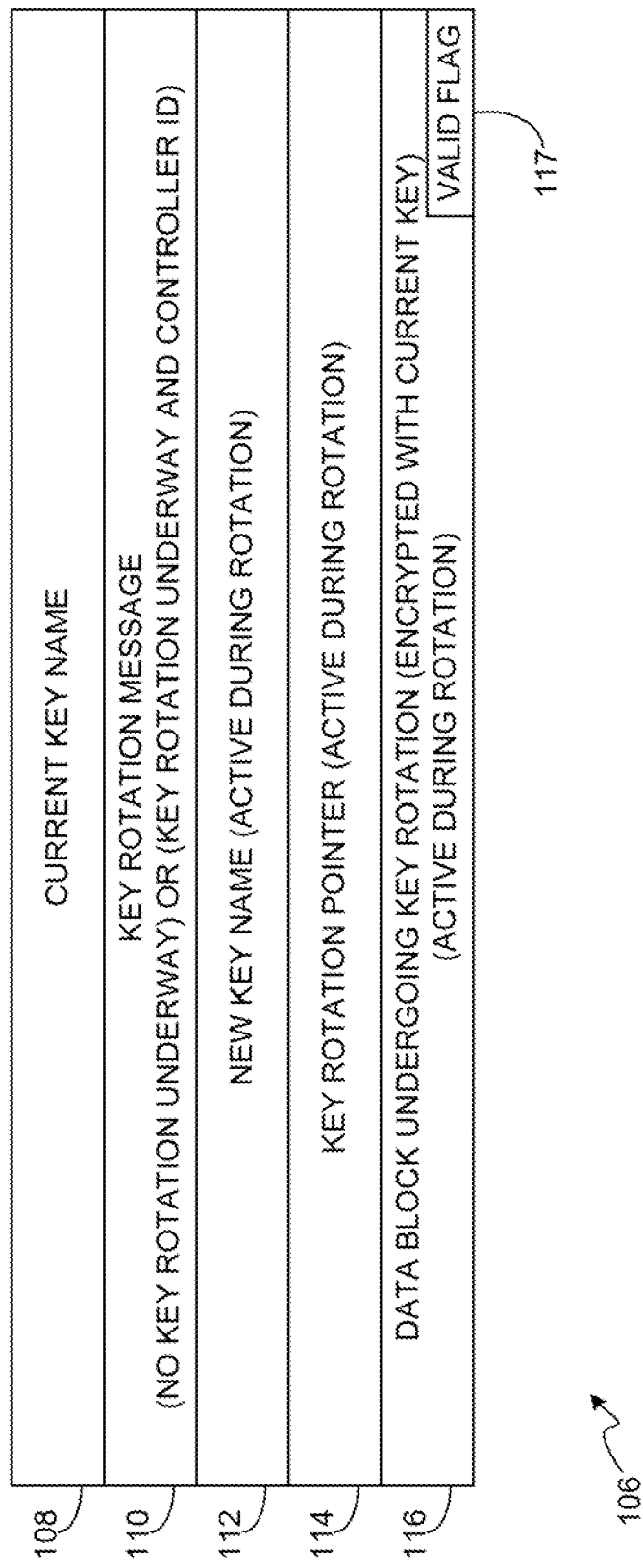
FIG. 9 shows a portion of a storage controller metadata section that is stored on storage media, such as the storage media shown in FIG. 3, in accordance with examples of the present invention.

FIG. 9 shows storage metadata section portion 106, which is an example of a portion of a storage metadata section, such as the storage metadata section shown in FIG. 3. In accordance with examples of the present invention, storage metadata section portion 106 includes fields that facilitate key rotation recovery in the event of a failure during the key rotation process.

Field 108 stores the current key name. The current key name identifies the key with which the data is encrypted when the storage media is not undergoing key rotation. During key rotation, the current key name identifies the key for data that has not yet undergone key rotation.

Field 110 stores the key rotation message. When key rotation is not underway, field 110 stores a "no key rotation underway" message. During key rotation, field 110 stores a "key rotation underway" message, and identifies the storage controller performing key rotation. As discussed above, the storage controllers not performing key rotation observe the "key rotation underway" message and suspend access to the encrypted portions of the storage media.

Field 112 stores the new key name. This field is only active during key rotation, and identifies the new key that is being used to re-encrypt the data during key rotation.

Field 114 stores the key rotation pointer shown in FIGS. 3 and 7. The key rotation pointer identifies the current data block undergoing key rotation.

Finally, field 116 stores the data block undergoing key rotation. The data block is encrypted with the current (old) key. As key rotation proceeds, the key rotation pointer is incremented, and the data block undergoing key rotation is stored in field 116. Field 116 also includes valid flag 117. Valid flag 117 indicates whether the data block undergoing key rotation is valid. For example, if key rotation is suspended to supply storage bandwidth to other workloads, valid flag 117 may be cleared to indicate that the data block stored in field 116 may not be valid.

In the event of a failure, such as a power failure, the key rotation process can be resumed at restart by observing the key rotation message in field 110. If key rotation was under-way at the time of the failure, normal operation and key rotation can be resumed using the current key name, the new key name, the key rotation pointer, and the data block currently undergoing key rotation stored in field 116. Also note that a different storage controller can be signaled to perform recovery. For example, if the storage controller performing key rotation failed, a different controller can access all the information needed to resume key rotation, with the storage controller resuming key rotation updating the controller ID in field 110, and the other controllers being signaled to observe the key rotation message.

After key rotation is complete, the new key name is written to field 108 as the current key name, the key rotation message is updated to "no key rotation underway" in field 110. Thereafter, the other storage controllers are signaled to read the key rotation message (or observe the message via polling) and can resume operation with the new key that was stored in current key field 108.

Note that during key rotation, storage controller metadata section portion 106 will experience a high level of access as the key rotation pointer in field 114 and the data block undergoing key rotation in field 116 are continually updated. In another example of the invention, it may be desirable to provide these fields on a different storage device to increase storage media device bandwidth of the device undergoing key rotation. For example, a high-speed non-volatile solid state storage device may be associated with each storage media device undergoing key rotation and used as a scratch pad to store the key rotation pointer and the data block undergoing key rotation.

Finally, note that many of the fields shown in FIG. 9 are provided to facilitate key rotation recovery. If key rotation recovery is not needed, or failures during key rotation are to be managed by a mirror or RAID restore operation, fields 112, 114, 116, and the Controller ID of field 110 may not be omitted.

Figure 10:
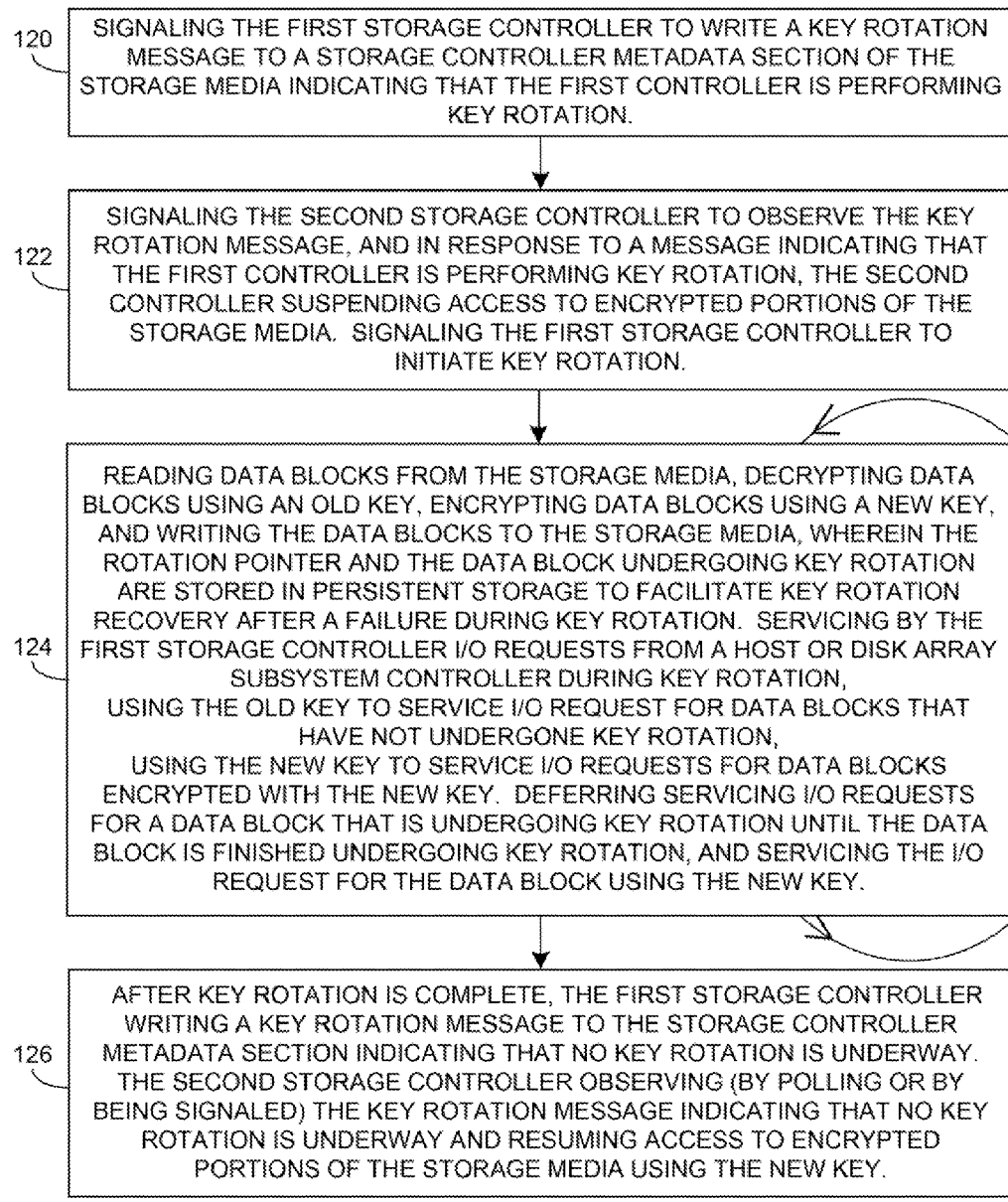
FIG. 10 shows a flowchart that illustrates a method for performing key rotation, in accordance with examples of the present invention.

FIG. 10 shows a flowchart 118 that illustrates a method in accordance with examples of the present invention. Flowchart 118 is merely representative and simplified compared to an actual implementation. Those skilled in the art will recognize that the blocks shown in flowchart 118 would typically be implemented by many execution threads operating simultaneously.

Flowchart 118 refers to first and second storage controllers. The first storage controller is the storage controller that performs the key rotation, and the second storage controller is the storage controller that suspends access to the storage media during key rotation. In the example discussed above with reference to FIG. 7, the first storage controller is storage controller 14, and the second storage controller is storage controller 16.

Flowchart 118 starts at block 120, where the first storage controller is signaled to write a key rotation message to a storage controller metadata section of the storage media indicating that the first controller is performing key rotation. Control passes to block 122. At block 122, the second storage controller is signaled to observe the key rotation message, and in response to a message indicating that the first controller is performing key rotation, the second controller suspends access to encrypted portions of the storage media. Control passes to block 124.

At block 124, the first storage controller is signaled to perform key rotation by reading data blocks from the storage media, decrypting data blocks using an old key, encrypting data blocks using a new key, and writing the data blocks to the storage media, with the rotation pointer and the data block undergoing key rotation being stored in persistent storage to facilitate key rotation recovery after a failure during key rotation, as discussed above with reference to FIG. 9. Block 124 also includes the first storage controller servicing I/O requests from a host or disk array subsystem controller during key rotation by using the old key to service I/O request for data blocks that have not undergone key rotation, and using the new key to service I/O requests for data blocks encrypted with the new key. I/O requests for a data block that is undergoing key rotation are deferred until the data block is finished undergoing key rotation, and then the I/O request for the data block is serviced using the new key. The steps shown in block 124 are performed until key rotation is complete, and then control passes to block 126.

At block 126, after key rotation is complete the first storage controller writes a key rotation message to the storage controller metadata section indicating that no key rotation is underway, and the second storage controller observes the key rotation message indicating that no key rotation is underway and resumes access to encrypted portions of the storage media using the new key. As discussed above, the second storage controller may be signaled to observe the key rotation message, or may observe the key rotation message by polling. At this point, key rotation is complete, and the storage controller and storage media may resume normal operation.

The examples of the invention described above provide many advantages in configurations where two or more controllers are coupled to storage media. The storage controller performs key rotation, so the host or DAS controller is not burdened with managing the key rotation process. The storage controller performing key rotation continues to service all I/O requests from the host or DAS controller during key rotation, so data continues to be available to the host or DAS controller. At any time, the storage controller can throttle or suspend key rotation to service I/O requests from the host or DAS controller, thereby providing full I/O bandwidth. Also, complete real-time redundant disk operation is maintained during key rotation.

The storage controllers are independent of each other. Typically no single hardware failure can bring down both controllers. The host or DAS controllers and the storage controllers are stateless and do not have to be aware of the encryption key rotation state. At any time, the host or DAS controller and the storage controllers can be reset and rebooted, and the current state of key rotation and encryption can be read from the storage controller metadata section of the storage media.

Key rotation is fast because the storage controllers coordinate only at the beginning and completion of key rotation, instead of coordinating during key rotation of each data block. Multiple storage controllers can perform key rotations at the same time on different storage media devices, and each storage controller can perform key rotation on multiple storage media devices at the same time.

In the foregoing description, numerous details are set forth to provide an understanding of the present invention. However, it will be understood by those skilled in the art that the present invention may be practiced without these details. While the invention has been disclosed with respect to a limited number of examples and embodiments, those skilled in the art will appreciate numerous modifications and variations therefrom. It is intended that the appended claims cover such modifications and variations as fall within the true spirit and scope of the invention.

What is claimed is:

1. A method of performing key rotation in a computing environment having a storage media and first and second storage controllers coupled to the storage media, the method comprising:
   signaling, with a host, the first storage controller to write a key rotation message to the storage media indicating that the first storage controller is performing key rotation;
   signaling, with the host, the second storage controller to observe the key rotation message from the storage media, wherein the second storage controller suspends access of the second storage controller to encrypted portions of the storage media in response to observing the key rotation message indicating that the first controller is performing key rotation; and
   signaling, with the host, the first storage controller to perform key rotation, wherein the first storage controller performs key rotation by reading data blocks from the storage media, decrypting data blocks using an old key, encrypting data blocks using a new key, and writing the data blocks to the storage media.

2. The method of claim 1 and further comprising:
   after key rotation is complete, the first storage controller writing a key rotation message to the storage media indicating that no key rotation is underway; and
   the second storage controller observing the key rotation message indicating that no key rotation is underway and resuming access of the second storage controller to encrypted portions of the storage media using the new key.

3. The method of claim 2 wherein the second storage controller observes the key rotation message by being signaled by the host to observe the key rotation message.

4. The method of claim 2 wherein the second storage controller observes the key rotation message by polling the key rotation message.

5. The method of claim 2 wherein key rotation includes storing a key rotation pointer and a data block undergoing key rotation in persistent storage to facilitate key rotation recovery after a failure during key rotation.

6. The method of claim 1 and further comprising:
   servicing by the first storage controller input/output requests (I/O requests from a host or disk array subsystem (DAS) controller during key rotation;
   using the old key to service I/O request for data blocks that have not undergone key rotation;
   using the new key to service I/O requests for data blocks encrypted with the new key; and
   deferring servicing I/O requests for a data block that is undergoing key rotation until the data block is finished undergoing key rotation, and servicing the I/O request for the data block using the new key.

7. Non-transitory computer readable media having computer executable program segments stored thereon, the computer executable program segments executable to cause a computer to:
   receive, by a media I/O module of a first storage controller, I/O requests and servicing the I/O requests to storage media, and observing key rotation messages stored in the storage media, wherein the media I/O module suspends access of the first storage controller to encrypted portions of the storage media upon observing a key rotation message stored in the storage media by a second storage controller indicating that key rotation is underway;

decrypt, by an encryption/decryption module of the first storage controller, data blocks read from the storage media using an old key;

rotate the old key to a new key, by a key rotation module of the first storage controller, wherein the key rotation module writes a key rotation message to the storage media indicating key rotation is underway before initiating key rotation; and encrypt by the encryption/decryption module of the first storage controller data blocks written to the storage media using the new key.

8. The readable media of claim 7 wherein the key rotation module writes a key rotation message to the storage media indicating that no key rotation is underway after completing key rotation.

9. The readable media of claim 8 wherein the media I/O module is signaled by the host to observe the key rotation message after completion of key rotation, and resumes access to encrypted portions of the storage media if the key rotation message indicates that no key rotation is underway.

10. The readable media of claim 8 wherein the media I/O module polls the key rotation message, and resumes access to encrypted portions of the storage media if the key rotation message indicates that no key rotation is underway.

11. The readable media of claim 7 wherein the media I/O module cooperates with the encryption/decryption module and the key rotation module to service I/O requests during key rotation, with the old key used to service I/O requests for data blocks that have not undergone key rotation, the new key used to service I/O requests for data blocks that have been encrypted with the new key, and I/O requests for a data block that is undergoing key rotation deferred until the key rotation operation for the data block is finished, and then servicing the I/O request for the data block using the new key.

12. A computing system comprising:
storage media;
a host coupled to a first storage controller and a second storage controller;
the first storage controller coupled to the storage media, wherein the first storage controller includes a key rotation module that, in response to a first signal from the host, writes a key rotation message to the storage media indicating that the first controller is performing key rotation; and
the second storage controller coupled to the storage media, wherein the second controller includes a media I/O module that, in response to a second signal from the host, reads the key rotation message from the storage media indicating that the first controller is performing key rotation and suspends access of the second storage controller to encrypted portions of the storage media;
wherein the first storage controller performs key rotation by reading data blocks from the storage media, decrypting data blocks using an old key,
encrypting data blocks using a new key, and writing the data blocks to the storage media.

13. The computing system of claim 12 wherein the key rotation module of the first storage controller performs key rotation, and when key rotation is complete, writes a key rotation message to the storage media indicating that no key rotation is underway.

14. The computing system of claim 13 wherein the media I/O module of the second storage controller reads the key rotation message indicating that no key rotation is underway and resumes access of the second storage controller to encrypted portions of the storage media.

15. The computing system of claim 13 wherein the media I/O module is signaled by a host to read the key rotation message.

16. The computing system of claim 13 wherein the media I/O module polls the key rotation.

17. The computing system of claim 12 wherein the computing system is a disk array subsystem (DAS), and further comprising:
a DAS controller coupled to the first and second storage controllers.

18. The computing system of claim 12 and further comprising:
persistent storage for storing a key rotation pointer and a data block undergoing key rotation to facilitate key rotation recovery after a failure during key rotation.

19. The computing system of claim 12 and further comprising:
a key manager coupled to the first and second storage controllers, the key manager including:
a key manager server module for providing keys to a key manager client module of the first and second storage controllers; and
a key table that stores and associates key names with keys.

20. The computing system of claim 12 and further comprising:
a key policy manager module for determining when keys should be rotated; and
a key rotation initiator module for signaling the first storage controller to initiate key rotation.

* * * * *

UNITED STATES PATENT AND TRADEMARK OFFICE
CERTIFICATE OF CORRECTION

PATENT NO. : 8,489,893 B2
APPLICATION NO. : 12/757855
DATED : July 16, 2013
INVENTOR(S) : Mihai Damian et al.

Page 1 of 1

It is certified that error appears in the above-identified patent and that said Letters Patent is hereby corrected as shown below:

In the Claims:

In column 12, line 45, in Claim 6, delete "requests" and insert -- requests) --, therefor. (second occurrence)

Signed and Sealed this
Twelfth Day of November, 2013

Teresa Stanek Rea
*Deputy Director of the United States Patent and Trademark Office*